United States Patent
Koren et al.

(10) Patent No.: US 8,229,798 B2
(45) Date of Patent: Jul. 24, 2012

(54) METHODS AND APPARATUS FOR MODELING RELATIONSHIPS AT MULTIPLE SCALES IN RATINGS ESTIMATION

(75) Inventors: Yehuda Koren, Elizabeth, NJ (US); Robert Bell, Murray Hill, NJ (US); Christopher Volinsky, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1128 days.

(21) Appl. No.: 12/107,309

(22) Filed: Apr. 22, 2008

(65) Prior Publication Data
US 2009/0083126 A1 Mar. 26, 2009

Related U.S. Application Data

(60) Provisional application No. 60/975,314, filed on Sep. 26, 2007.

(51) Int. Cl.
*G06Q 30/00* (2012.01)
(52) U.S. Cl. ............ 705/26.7; 705/7.29; 705/26.63
(58) Field of Classification Search ............ 705/7.29, 705/7.31, 26.1, 26.61, 26.63, 26.64, 26.7
See application file for complete search history.

(56) References Cited

U.S. PATENT DOCUMENTS

| | | | |
|---|---|---|---|
| 7,403,910 B1* | 7/2008 | Hastings et al. | 705/26.1 |
| 2002/0199186 A1* | 12/2002 | Ali et al. | 725/28 |
| 2003/0065520 A1* | 4/2003 | Jutzi et al. | 705/1 |
| 2003/0110056 A1* | 6/2003 | Berghofer et al. | 705/1 |
| 2004/0054572 A1* | 3/2004 | Oldale et al. | 705/10 |
| 2005/0125307 A1* | 6/2005 | Hunt et al. | 705/26 |
| 2006/0026048 A1* | 2/2006 | Kolawa et al. | 705/7 |
| 2006/0259344 A1* | 11/2006 | Patel et al. | 705/9 |

OTHER PUBLICATIONS

Cheung, Kwok-Wai, James Kwok, Martin Law, and Kwok-Ching Tsui. "Mining customer product ratings for personalized marketing." Decision Support Systems. 35.2 (2003): 231-243. Print.*

* cited by examiner

*Primary Examiner* — Beth V Boswell
*Assistant Examiner* — William Brockington, III

(57) ABSTRACT

Systems and techniques for generating item ratings for a user in order to allow for recommendations of selected items for that user. A set of known ratings of different items for a plurality of users is collected and maintained, and these known ratings are used to estimate rating factors influencing ratings, including user and item factors. Initial user and item factors are estimated and new user and item factors are successively added, with the original rating factors being progressively shrunk so as to reduce their magnitude and their contribution to the rating estimation as successive factors are added. When an appropriate number of user and item factors has been estimated, the rating factors are used to estimate ratings of items for a user, and the estimated ratings are employed to generate recommendations for that user.

13 Claims, 4 Drawing Sheets

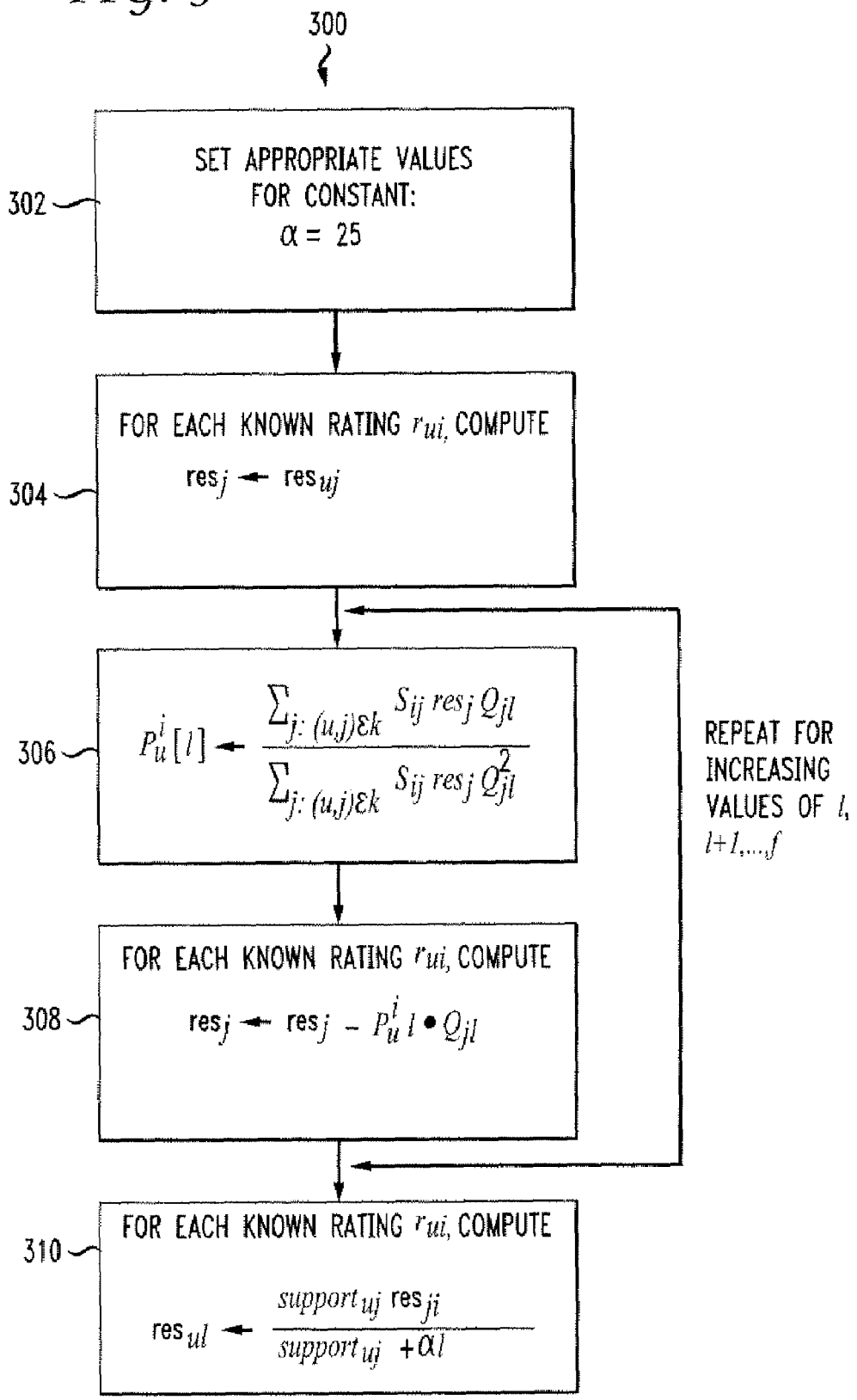

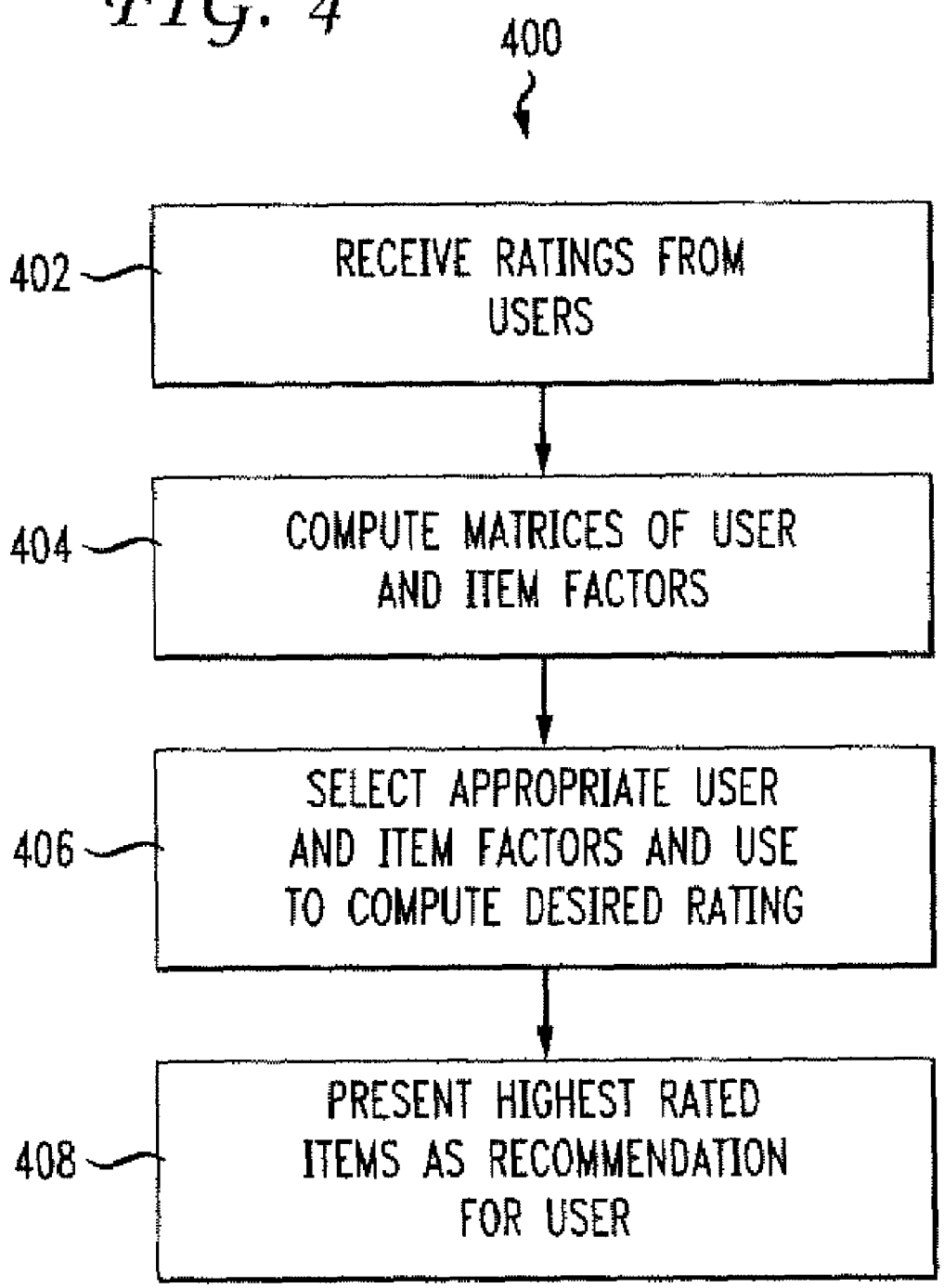

METHODS AND APPARATUS FOR MODELING RELATIONSHIPS AT MULTIPLE SCALES IN RATINGS ESTIMATION

This Application claims the benefit of Provisional Application Ser. No. 60/975,314, filed Sep. 26, 2007, which is incorporated by reference herein in its entirety. Related material is presented in Koren and Bell, "Systems and Techniques for Improved Neighborhood Based Analysis in Rating Estimation," U.S. patent application Ser. No. 12/107,449, filed on even date with the present invention, assigned to the common assignee of the present invention and incorporated herein by reference in its entirety.

FIELD OF THE INVENTION

The present invention relates generally to improvements to estimating unknown user ratings in recommender systems. More particularly, the invention relates to improved systems and techniques for modeling of relationship on multiple scales in order to achieve improved rating estimation.

BACKGROUND OF THE INVENTION

Modern consumers are inundated with choices. Numerous varieties of products are offered to consumers, with consumers having unprecedented opportunities to select products that meet their needs. The opportunity for selection brings with it the need to spend time and effort engaging in the selection process. The development of widely used and inexpensive processing systems has led vendors to develop techniques for directing customers to products expected to satisfy them. One area in which such systems are particularly useful is that of entertainment products, such as movies. Numerous customers may view the same movie, and in addition, each customer is likely to view numerous different movies. Customers have proven willing to indicate their level of satisfaction with particular movies, so that a large volume of data is available as to which movies appeal to which customers. Proper examination and processing of this data can be used to recommend movies to particular customers, and such examination and processing can be conducted for any sort of product or service for which data can be collected.

The remainder of this discussion will be presented in terms of ratings of movies, although it will be recognized that the teachings of the present invention can be applied to any situation in which it is desired to estimate the desirability of an item for a user. In this context, a movie recommendation is essentially an estimate of the rating a user would give to a movie that he or she has not yet viewed, based on computations based on previous ratings. One approach to computing ratings in order to generate movies is to use a factorization based approach. Such an approach identifies a set of features that characterize all movies and ratings, and uses these features to identify the closeness of users rating items and items being rated with the item and user for whom a rating is being estimated.

SUMMARY OF THE INVENTION

Among its several aspects, the present invention recognizes that identification of factors in the past has involved collecting substantial amounts of external information, such as by presenting a questionnaire to a user. Such data collection represents a significant burden on users, and may also prove imprecise because many users cannot or do not explicitly articulate the features that are of importance to them in their enjoyment of a movie.

The present invention, therefore, provides for improved systems and techniques for using ratings of movies from the user in question and from other users to identify features that can be used to estimate a rating, suitably using improved techniques for principal component analysis and singular value decomposition that take into account the large number of unknown values typically present in any user rating system. An initial set of rating factors, including a plurality of user factors and item factors, is estimated based on known ratings, and additional factors are generated by training on the known ratings, with each successive set of features being shrunk so as to progressively diminish the influence of successively computed sets of factors. The user and item factors are then employed to estimate ratings. Suitably, all unknown ratings are estimated for each user. The estimated ratings are then used to generate recommendations for presentation to a user, for example, when a user logs on to a system, such as a subscription system.

A more complete understanding of the present invention, as well as further features and advantages of the invention, will be apparent from the following Detailed Description and the accompanying drawings.

BRIEF DESCRIPTION OF THE DRAWINGS

FIG. 3 illustrates an alternative process of factor computation according to an aspect of the present invention; and FIG. 4 illustrates a process of movie recommendation and distribution according to an aspect of the present invention.

DETAILED DESCRIPTION

Figure 1:
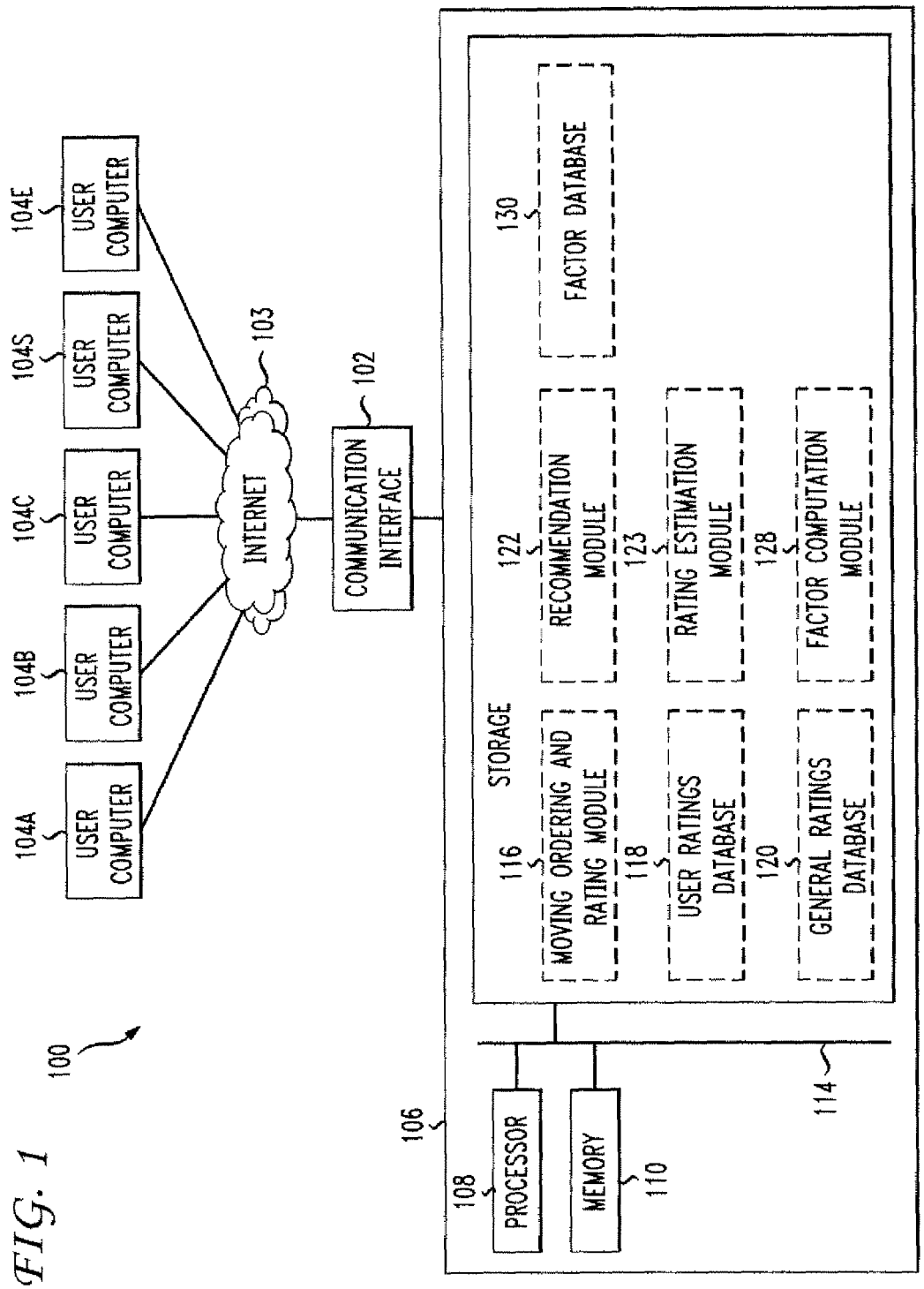
FIG. 1 illustrates a movie distribution system employing the teachings of the present invention.

FIG. 1 illustrates a movie distribution system 100 employing the teachings of the present invention. The system 100 includes a communication interface 102, suitably connected to the Internet 103, allowing communication with a plurality of customer stations 104A-104E, which may suitably be computers, cellular telephones, personal digital assistants, or any other suitable communication devices. The system 100 further includes a server 106, including a processor 108, memory 110, and storage 112, communicating over a bus 114. The server 106 is suitably connected to the communication interface 102 through the bus 114. While a single server 106 is illustrated here for simplicity, it will be recognized that a system 100 may include multiple servers and other devices, arranged in whatever way is desired to meet the communication and processing demands imposed on the system 100.

The server 106 hosts a movie ordering and rating module 116, implemented as software hosted on the storage 112 and transferred to memory 110 as needed for execution by the processor 108. When a users for example, user A at user station 104A, initiates contact with the system 100, the ordering and rating module 116 is invoked, allowing a user to browse and search movies for ordering. In addition, a suitable time after ordering, such as when a movie is returned in the case of a rental or subscription service, the user is given an opportunity to rate a movie, for example on a 1-5 scale, with 1 being "poor" and 5 being "excellent. The ratings given by a user are stored, along in a user ratings database 118 associated with the specific user, and a general ratings database 120, in which the ratings are stored in combination with those of all other users. The general ratings database 120 suitably includes ratings from all users of the system 100. Each rating is associated with a specific user, in the sense that ratings from the same user can be identified as having come from the same user, but in the general ratings database 120, the association of a rating with a user may not necessarily include identifying information for the user.

In offering movies to the user, the ordering and rating module 116 suitably invokes a recommendation module 122. The recommendation module 122 presents specific recommended movies to the user, based on ratings computed for the movies, with ratings being treated according to some selected criterion. For example, the recommendation module 122 may present the 5 movies having the highest ratings, for example, by presenting a list of recommendations to the user at station 104A when that user logs onto the system 100, or by emailing a list of recommendations to users, such as users who have signed up to receive such recommendations. To take another example, the recommendation module 122 may present the 5 movies of each of a selection of genres having the highest ratings for movies of that genre, for example, 5 highest rated comedies, 5 highest rated action movies, 5 highest rated dramas, and so on. The recommendation module 122 suitably employs a rating estimation module 123, which computes estimated rating values for each movie to be rated. The rating estimated module 123 computes a value $r_{ui}$, which is an estimate of the rating that a user U would assign to the item i. If the user u has already rated the item i, there is no need to compute a rating for that user and that item. Instead, that rating serves as useful data for estimating ratings for other items by the same user, and for ratings of that item by other users. The rating estimation module 123 performs computations to estimate a rating $r_{ui} = p_u^T q_i$, where each user u is assigned to a vector $p_u \in R^f$ and each item i is assigned to a vector $q_i \in R^f$. This estimation is accomplished in an iterative process, whose goal is to find values for $p_u$ and $q_i$. The development of the procedure, and the information described by the various variables and values, is addressed in detail below.

If the system 100 includes n users and m items, the total available ratings would theoretically include ratings about n users and m items, arranged in an n×m matrix $R = \{r_{ui}\}_{1 \leq u \leq m, 1 \leq i \leq n}$. In reality, every item is not viewed by every user, and each user typically views only a small, or very small, proportion of the items and does not necessarily rate every item he or she does view. The matrix R will therefore include a great number of unknown values, and thus may be referred to as a sparse matrix. The rating estimation module 123 has access to the user ratings database 118 and the general ratings database 120, and processes rating information to generate one or more recommendations for the user that are estimated to conform to the user's preferences. The known entries of the matrix R, that is, those (u,i) pairs for which data is known, may be arranged in the set $\kappa = \{(u,i) | r_{ui} \text{ is known}\}$. Data for the set $\kappa = \{(u,i) | r_{ui} \text{ is known}\}$ may be stored in the general database 120.

A set of indexing letters is employed here to distinguish users from items, and to distinguish those users and items for whom computations are being performed from those users and items whose data is known and is available for use in computations. Users may suitably be designated as u and v, with u being the user for whom an estimated value is being sought, and items as i, j, and k, with i being the item for which an estimated value is being sought.

In order to compute ratings, the rating estimation module 123 suitably performs a factorization based estimation procedure, computing a limited set of features that characterize all users and items. These features provide linkage between users with items and estimation of the associated ratings, and provide a high level, or regional, view. For example, ill the case of user-movie ratings, regional features might be movie genres. One of the features could measure the fitting into the action genre, while another feature could measure fitting into the comedy genre. Each movie and each user is placed within these genre-oriented scales. Then, when given a particular user-movie pair, the rating is estimated by the closeness of the features representing the movie and the user. Ranking users and items within prescribed features, such as movie genres, pertains to content-based methods, which requires additional external information on items and users beyond the past ratings, and might present considerable complexity. However, a procedure performed by the rating estimation module 123, uncovers latent features of the given data that explain the ratings, as a surrogate for the external information. These features may be thought of as rating factors, including item factors and user factors, as explained further below.

Such a data analysis can be achieved by employing matrix factorization techniques such as singular value decomposition (SVD) or principal components analysis (PCA). Given an m×n matrix R, SVD computes the best rank-f approximation $R^f$, which is defined as the product of two rank-f matrices $P_{m \times f}$ and $Q_{n \times f}$, where $f \leq m, n$. That is, $R^f = PQ^T$ minimizes the Frobenius norm $\|R - R^f\|_F$ among all rank-f matrices. In this sense, the matrix $R^f$ captures the f most prominent features of the data, leaving out less significant features of the data that might be mere noise. Consequently, each unknown rating, $r_{ui}$, is estimated as $R^f_{ui}$, which is a dot product of the u-th row of P with the i-th row of Q. The values of P are referred to as the user factors and the values of Q are referred to as the item factors. It will be recalled that $R^f$ is an approximation of the matrix R, which, as noted above, is a matrix of the values of $r_{ui}$. Because $R^f$ can be computed by $PQ^T$ values for P and Q will yield estimates for the unknown values of $r_{ui}$.

The ratings estimation module 123 therefore implements an efficient procedure for estimating values of P and Q, and uses these values to compute the value of $R^f$. Desired values of $r_{ui}$ can then be retrieved from the matrix $R^f$ as desired, and values of $r_{ui}$ for each user can also be stored in a record in the database 118 associated with that user.

Applying an SVD-based technique to collarborative filtering raises unique difficulties due to the sparsity issue. The conventional SVD computation requires that all entries of R be known, and the goal of SVD is not properly defined when some entries of R are missing. In order to overcome problems associated with sparsity, the ratings estimation module 123 employs techniques that avoid overfitting for items and users with relatively sparse data.

In order to overcome difficulties associated with sparsity, the ratings estimation module 123 implements a generalization of SVD that is capable of allowing for unknown values, using an expectation maximization algorithm for PCA. Prior art techniques often compute the PCA of a matrix R by working on its associated covariance matrix. However, the present invention employs a different and more efficient approach, described in greater detail below.

As noted above, when the matrix R is complete, that is, when the matrix has no missing entries, the goal of SVD is to compute two rank-f matrices P and Q, that minimize $\|R - PQ^T\|_F$. The matrix P can be fixed as some matrix $\hat{P}$, such that minimization of $\|R - PQ^T\|_F$ would be equivalent to the least squares solution of $R = \hat{P}Q^T$. Analogously, Q can be fixed as $\hat{Q}$, so that the minimization problem becomes the least squares solution of $R = U\hat{Q}^T$.

These least squares problems can be minimized by setting $Q^T=(\hat{P}^T\hat{P})^{-1}\hat{P}^{T^R}$ and $P=R\hat{Q}(\hat{Q}^T\hat{Q})^{-1}$, leading to an iterative process that alternately recomputes the matrices P and Q, as follows:

$$Q^T \leftarrow (P^TP)^{-1}P^TR \quad (1)$$

$$P \leftarrow RQ(Q^TQ)^{-1} \quad (2)$$

It can be shown that the only possible minimum is the global one, so that P and Q must converge to the true SVD subspace.

One of the advantages of this iterative SVD computation is its ability to deal with missing values. The techniques implemented by the rating estimation module 123 perform this computation in a way that allows the handling of the many missing values that may be expected, while avoiding a need for imputation, that is, insertion of arbitrary values, or values taken from other sources, in place of unknown values.

The ratings computation module 123 estimates the value $r_{ui}$ in such a way as to minimize the error between the factors based estimates and the known ratings, that is, to minimize the value $$Err(P,Q) \stackrel{def}{=} \sum_{(u,i \in K)} (r_{ui} - p_u^T q_i)^2 \quad (3)$$

Here, $p_u$ is the u-th row of P, which corresponds to user u. Similarly, $q_i$ is the i-th row of Q, corresponding to item i.

An important consideration is to determine an optimal value of f, which is the rank of the matrices Q and P, representing the number of latent factors to be computed. An increase in the value of f increases the flexibility in the choices available for minimizing the squared error Err(P,Q), given by equation (3). However, while Err(P,Q) measures the ability to recover the known ratings, the unknown ratings are truly of interest. The unknown ratings are the ratings that accurately reflect the rating that a user would give to an item if he or she viewed the item.

Achieving a low value for Err(P,Q) might involve overfitting the available ratings, while lowering the estimation quality for the unknown ratings. In addition, the desire to avoid imputation imposes the constraint that a relatively low number of known ratings are available to be fitted. Therefore, the problem does not allow many degrees of freedom, preventing the use of more than a very few factors. Experimental results show that the use of more than two factors, that is, a value of f greater than 2, degrades estimation quality. However, the ratings estimation module 123 employs shrinkage to appropriately reduce the impact of various elements of data. This use of shrinkage, detailed further below, allows for the use of a larger number of factors. The use of shrinkage to allow for this larger number of factors explains more latent aspects of the data, while reducing overfitting.

The factors are therefore computed one by one, while shrinking the results after each additional factor is computed. In this way, a larger number of factors is used, with the strength of each factor being gradually limited.

This computation of factors, with accompanying shrinkage, can suitably be achieved by repeatedly calling a function for computing the next set of factors. The function computes the f-th columns of the matrices P and Q, under the presumption that the 1$^{st}$ through f-1th columns have already been computed, and is performed f times, using values of f ranging from 1 to f, in order to compute the matrices P and Q. The inputs are the known ratings $r_{ui}$, the user factors $Q_{n \times f}$ and the item factors $P_{m \times f}$.

Figure 2:
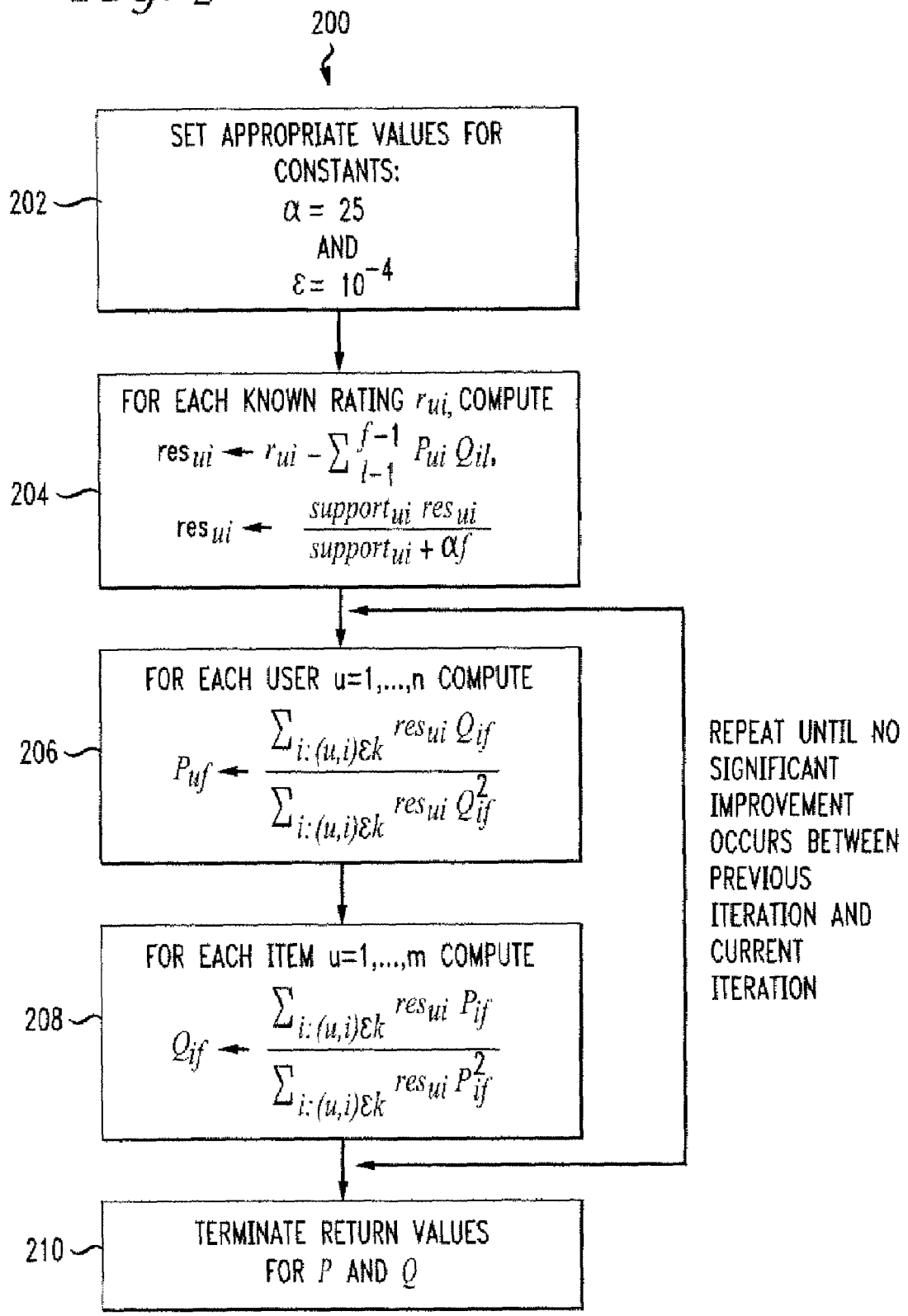
FIG. 2 illustrates a process of factor computation according to an aspect of the present invention.

FIG. 2 illustrates the steps of a process 200 of computing the values of P and Q, suitably performed by a factor computation module 128. At step 202, appropriate values for constants are set. In the present exemplary case, these values are $\alpha=25$ and $\epsilon=10^{-4}$. First, a residuals portion is computed at step 204, for each known rating $r_{ui}$. At step 204 the value $res_{ui} \leftarrow r_{ui} - \sum_{l=1}^{f-1} P_{ul}Q_{il}$ is computed for each known rating $r_{ui}$ to provide values for the columns of P and Q being computed, and $$res_{ui} \leftarrow \frac{support_{ui} res_{ui}}{support_{ui} + \alpha f}$$

is computed to accomplish shrinkage of factors. Next, the f-th factor for each user and item is computed by solving many least squares problems, each with a single unknown. This computation is accomplished by repeatedly performing steps 206 and 208. At step 206, for each user u=1, . . . , n, the computation $$P_{uf} \leftarrow \frac{\sum_{i:(u,i) \in \kappa} res_{ui} Q_{if}}{\sum_{i:(u,i) \in \kappa} res_{ui} Q_{if}^2}$$

is performed. At step 208, for each item i=1, . . . , m, the computation $$Q_{if} \leftarrow \frac{\sum_{u:(u,i) \in \kappa} res_{ui} P_{uf}}{\sum_{u:(u,i) \in \kappa} res_{ui} P_{uf}^2}$$

is performed. These steps 206 and 208 are repeated until no significant improvement in the error value, computed in equation (3) above, is observed between the current iteration and the previous iteration, specifically, while $$\frac{Err(P^{new}, Q^{new})}{Err(P^{old}, Q^{old})} > 1 - \varepsilon.$$

This convergence typically occurs within 3 to 5 iterations. When no significant improvement has occurred during the current iteration, the process ends at step 210 and the values that have been computed for P and Q are returned.

In order to compute f factors, the process 200 is performed f times, with increasing values of f. Once this has been accomplished, the values of P and Q are known, and the values of $R^f$, and therefore of $r_{ui}$, can be obtained by performing the computation $$R^f = PQ^T \quad (4)$$

The shrinkage accomplished above through the use of the computation $$res_{ui} \leftarrow \frac{support_{ui} res_{ui}}{support_{ui} + \alpha f},$$

reduces the magnitude of the residual according to two elements. The first element is the number of already computed factors f. As more factors are computed, the added factors explain lower variations of the data.

The second element is the support behind the value of $r_{ui}$, which is denoted by $\text{support}_{ui}$. This support is the minimum between the number of ratings by user u and the number of users that rated item i. As the support grows, more information is available regarding the involved user and item, and more factors can be used to explain this information. Shrinkage allows for improved estimation as factors are added. However, estimation improvement levels off beyond 30 to 50 factors and becomes insignificant thereafter.

Computation of the f-th factor is accomplished by alternating between fixing item values and user values. Each user and each item is dealt with separately, so that the resulting least squares problem involves only one variable.

As noted above, the repeated execution of the process 200 yields an approximation of all ratings in the form of a matrix product $R^f = PQ^T$. In this way, each rating $r_{ui}$ is estimated as the inner product of the f factors that have been obtained for u and i, that is, $p_u^T q_i$.

A major advantage of such a regional, factorization-based approach is its computational efficiency. The computational burden lies in an offline, preprocessing step where all factors are computed, performed here by the factor computation module 128. The computed factors can be stored in a factor database 130. The actual, online rating prediction may be done instantaneously by taking the inner product of two length-f vectors using data taken from the database 130. Because the factors are computed iteratively, they can be easily adapted to changes in the data such as addition of new ratings, users, or items. The relevant variables can be trained by performing a number of iterations of the procedure described above, updating only the relevant variables.

If desired, the approach above can be modified to take neighborhood awareness into account. In the process described above, the profile of the user u is described by the vector $p_u \in R^f$, such that his or her ratings are given by $p_u^T Q^T$. However, an alternative process according to an aspect of the present invention provides, instead of a fixed linear combination $p_u$, a more adaptive linear combination that changes as a function of the item i whose rating by u is being estimated. According to this alternative procedure, estimating $r_{ui}$ involves computing a vector $p_u^i \in R^k$. This vector is dependent on both u and i. $r_{ui}$ is then estimated as $(p_u^i)^T q_i$.

As noted above, the user vector $p_u$ is computed so as to minimize, up to shrinkage, the squared error associated with u, as follows:

$$\sum_{j:(u,j)\in K} (r_{uj} - p_u^T q_j)^2 \quad (5)$$

If the specific rating to be estimated is known to be $r_{ui}$, the squared error computation can be tilted to overweight items similar to i, according to the following error function:

$$\sum_{j:(u,j)\in K} s_{ij}(r_{uj} - p_u^T q_j)^2 \quad (6)$$

The value $s_{ij}$ is a measure of the similarity between i and j, subjected to shrinkage. One suitable similarity measure is an inverse power of the Euclidean distance, but numerous other similarity measures may be used. The minimizer of the error function (18), up to shrinkage, would be $p_u^i$, which characterizes user u within i's neighborhood. The f components of $p_u^i$ are computed one by one.

FIG. 3 illustrates a process 300 for computing the values of $p_u^i$, according to an aspect of the present invention. The process 300 performs steps to compute a function with arguments being the known ratings $r_{uj}$, user u, item i, and the item factors $Q_{m \times f}$ as addressed further below. First, at step 302, a constant is set to an appropriate value. An appropriate value is 25, and the operation is suitably $\alpha \leftarrow 25$. Next, residuals, that is, the portion of the ratings that are not explained by previous factors, are initialized. Thus, at step 304, for each known rating $r_{uj}$, the computation $res_j \leftarrow res_{uj}$ is performed. Next, a factor by factor sweep is performed. The steps 306, 308, and 310 are performed for increasing values of a variable l, l=1, . . . , f. At step 306, the computation $$p_u^i[l] \leftarrow \frac{\sum_{j:(u,j)\in K} s_{ij} res_j Q_{jl}}{\sum_{j:(u,j)\in K} s_{ij} res_j Q_{jl}^2}$$

is performed. At step 308, for each known rating $r_{uj}$, the computation $res_j \leftarrow res_j - p_u^i l \cdot Q_{jl}$ is performed and at step 310, for each known rating $r_{uj}$, the computation $$res_{ui} \leftarrow \frac{support_{uj} res_{ji}}{support_{uj} + \alpha l}$$

is performed.

Computation of the vector $p_u^i$ characterizes u at the neighborhood of i. The estimate of $r_{ui}$ is thus $(p_u^i)^T q_i$, rather than $p_u^T q_i$. Introduction of neighborhood awareness improves the quality of the results, compared to neighborhood only or regional only approaches. In addition, typically all item-item similarities (the $s_{ij}$ values) are precomputed and stored for quick retrieval. This enables a very quick execution of the process 300, which contains no iterative component. Overall running time is only slightly more than for the original factorization based approach described above.

A complementary step would be to recompute the item factors by making them neighborhood-aware. That would constitute replacing $q_i$ with $q_i^u$, which can be computed analogously to $p_u^i$ by accounting for similarities of other users to user u. Consequently, the rating $r_{ui}$ is estimated by $(p_u^i)^T q_i^u$. This recomputation results in an additional improvement in estimation accuracy.

In addition, item-item similarities and user-user similarities are naturally integrated into a single estimate, by employing item-item similarities when computing the user factors, and user-user similarities when computing the item factors. However, making the item factors neighborhood aware typically requires an additional computational effort, because user-user similarities are generally not stored due to the large number of users.

FIG. 4 illustrates the steps of a process 400 of rating estimation and recommendation according to an aspect of the present invention. At step 402, a plurality of movie ratings are received from users. The users may suitably be subscribers to a movie service, with users who have recently returned movies being solicited to provide ratings of those movies. A matrix of all movie ratings by all users is suitably constructed and stored. At step 404, values of P and Q are computed, suitably by performing the process 200 of FIG. 2 or the process 300 of FIG. 3. At step 406, when a set of ratings is to be generated, appropriate elements of P and Q are selected and used to generate ratings $r_{ui}$. For example, ratings may be generated for all users, or for a user logging on to a system such as the system 100. At step 408, suitably performed when a user logs on to a service, a suitable number of movies having the highest values for $r_{ui}$ are selected and their titles and additional relevant information presented to the user as recommendations. If desired, selection and presentation may be performed for groups of movies in multiple genres, such as recommended comedies, recommended dramas, and the like.

While the present invention is disclosed in the context of a presently preferred embodiment, it will be recognized that a wide variety of implementations may be employed by persons of ordinary skill in the art consistent with the above discussion and the claims which follow below.

We claim:

1. A system for estimating user ratings for one or more items, based on previous user rating activity, comprising:
    a processor;
    a memory for storing data and instructions for execution by the processor;
    a database hosted in the memory for storing rating information for a plurality of items and a plurality of users;
    a rating estimation module hosted as software stored in the memory and executable by the processor, the rating estimation module being operative to estimate a rating $r_{ui}$ for a first item i by a user u based on a) rating activity by the user u for items other than the first item i and b) rating activity by users other than the user u for the first item i and items other than the first item i, the rating estimation module being operative to compute an estimate of the rating $r_{ui}$ by identifying a plurality of rating factors, including original item factors and user factors based on known ratings of items provided by users during previous rating activity by users, successively adding rating factors based on a correlation between the original and additional rating factors with known ratings of items provided by users during previous rating activity by users, the original rating factors being progressively shrunk so as to reduce their magnitude and their contribution to the estimate of the rating $r_{ui}$ as additional rating factors are computed, and computing the estimate of the rating $r_{ui}$ based on the rating factors, the estimate of the rating $r_{ui}$ being a product of a vector of the item factors for the item and a vector of the user factors for the user;
    wherein a set of user and item factors is precomputed and stored, and the rating estimation module retrieves user and item factors for a specific user and item in order to compute a rating for that user and item; and
    wherein each $f^{th}$ user factor $P_{uf}$ is iteratively precomputed as follows for each user u=1 . . . n:

$$P_{uf} \leftarrow \frac{\sum_{i:(u,i)\in K} res_{ui} Q_{if}}{\sum_{i:(u,i)\in K} Q_{if}^2}$$

and each $f^{th}$ item factor $Q_{uf}$ is iteratively precomputed as follows for each item i=1 . . . m $$Q_{if} \leftarrow \frac{\sum_{u:(u,i)\in K} res_{ui} P_{uf}}{\sum_{u:(u,i)\in K} P_{uf}^2}$$

wherein $\chi$ is a set of known ratings for users u and items i, and $res_{ui}$ is a residuals portion computed as follows for each know rating $r_{ui}$:

$$res_{ui} \leftarrow r_{ui} - \sum_{l=1}^{f-1} P_{ul} Q_{il}$$

and adjusted as follows to provide shrinkage:

$$res_{ui} \leftarrow \frac{support_{ui} res_{ui}}{support_{ui} + \alpha f},$$

wherein $\alpha$ is a constant and $support_{ui}$ is a support behind a rating $r_{ui}$.

2. The system of claim 1, wherein the rating estimation module determines an optimal number of rating factors to be computed in order to capture the most prominent features of the ratings data while leaving out features making a relatively insignificant contribution.

3. The system of claim 1, wherein the rating estimation module computes an estimated rating for a user and item by taking the vector of item factors for the item and the vector of user factors for the user from the stored user and item factors and computing a product of the vectors to determine the estimated rating.

4. The system of claim 1, wherein the rating factors are trained by minimizing the error between factor based ratings estimates and known ratings.

5. The system of claim 4, wherein the number of rating factors used is determined by iteratively increasing the number of rating factors until less than a predetermined improvement occurs between iterations.

6. The system of claim 1, wherein an estimate of a rating is based on an inner product of the item factors and the user factors for the user and item for which the rating is being estimated.

7. The system of claim 1, wherein determination of the rating factors includes employing a similarity measure subjected to shrinkage in order to reduce the magnitude of the similarity measure, so as to prevent an excessive influence by the similarity measure, the similarity measure being used to overweight items similar to the item for which a rating is being estimated.

8. A method of estimating a user rating for a first item, based on a) previous rating activity by the same user for items other than the first item and b) previous rating activity by different users for the first item and items other than the first item, comprising the steps of:
    in a processor of a network server, identifying a plurality of rating factors, including original item factors and user factors based on previous user provided ratings;
    in the processor, successively adding rating factors based on a correlation between the original and additional rating factors with known ratings of items provided by users during previous rating activity by users, the original factors being progressively shrunk so as to reduce their magnitude and their contribution to the rating estimation as successive factors are added; and in the processor, estimating a user rating for the first item based on the rating factors, the estimated rating being a product of a vector of the item factors for the item and a vector of the user factors for the user;

wherein each $f^{th}$ user factor $P_{uf}$ is iteratively precomputed as follows for each user u=1 ... n:

$$P_{uf} \leftarrow \frac{\sum_{i:(u,i)\in K} res_{ui} Q_{if}}{\sum_{i:(u,i)\in K} Q_{if}^2}$$

and each $f^{th}$ item factor $Q_{if}$ is iteratively precomputed as follows for each item i=1 ... m $$Q_{if} \leftarrow \frac{\sum_{u:(u,i)\in K} res_{ui} P_{uf}}{\sum_{u:(u,i)\in K} P_{uf}^2}$$

wherein $\chi$ is a set of known ratings for users u and items i, and $res_{ui}$ is a residuals portion computed as follows for each know rating $r_{ui}$:

$$res_{ui} \leftarrow r_{ui} - \sum_{l=1}^{f-1} P_{ul} Q_{il}$$

and adjusted as follows to provide shrinkage:

$$res_{ui} \leftarrow \frac{support_{ui} res_{ui}}{support_{ui} + \alpha f},$$

wherein $\alpha$ is a constant and $support_{ui}$ is a support behind a rating $r_{ui}$.

9. The method of claim 8, further comprising a step of determining an optimal number of rating factors so as to capture the most prominent features of the ratings data while leaving out relatively insignificant features.

10. The method of claim 8, wherein the rating factors are trained by minimizing the error between factors based ratings estimates and known ratings.

11. The method of claim 8, wherein the number of rating factors used is determined by iteratively increasing the number of rating factors until less than a predetermined improvement occurs between iterations.

12. The method of claim 8, wherein an estimate of a rating is based on an inner product of the item factors and the user factors for the user and item for which the rating is being estimated.

13. The method of claim 8, wherein determination of the rating factors includes employing a similarity measure subjected to shrinkage in order to reduce the magnitude similarity measure, so as to avoid assigning it an excessive influence, the similarity measure being used to overweight items similar to the item for which a rating is being estimated.

* * * * *